(12) United States Patent
Gordon-Carroll et al.

(10) Patent No.: US 8,266,453 B2
(45) Date of Patent: Sep. 11, 2012

(54) OBTAINING BACKUPS USING A PORTABLE STORAGE DEVICE

(75) Inventors: Clint Gordon-Carroll, Orem, UT (US); Cody Cutrer, Saritoga Springs, UT (US); Jeremy Stanley, Orem, UT (US)

(73) Assignee: Decho Corporation, Pleasant Grove, UT (US)

( * ) Notice: Subject to any disclaimer, the term of this patent is extended or adjusted under 35 U.S.C. 154(b) by 487 days.

(21) Appl. No.: 12/319,136

(22) Filed: Dec. 31, 2008

(65) Prior Publication Data

US 2010/0169668 A1 Jul. 1, 2010

(51) Int. Cl.
*G06F 11/30* (2006.01)
(52) U.S. Cl. ........................................ 713/193; 711/162
(58) Field of Classification Search .................. 713/193; 710/100; 707/E17.005; 711/162, E12.103
See application file for complete search history.

(56) References Cited

U.S. PATENT DOCUMENTS

| 5,089,958 | A | 2/1992 | Horton et al. ................. 714/5.11 |
|---|---|---|---|
| 5,742,792 | A | 4/1998 | Yanai et al. ..................... 711/162 |
| 6,134,660 | A | 10/2000 | Boneh et al. ................... 713/193 |
| 6,282,610 | B1 | 8/2001 | Bergsten ........................ 711/714 |
| 6,411,943 | B1 | 6/2002 | Crawford ...................... 705/400 |
| 6,941,490 | B2 | 9/2005 | Ohran ........................... 714/15 |
| 7,165,154 | B2 * | 1/2007 | Coombs et al. ............... 711/162 |
| 7,284,150 | B2 | 10/2007 | Ma et al. ....................... 714/6.23 |
| 7,434,093 | B2 | 10/2008 | Ohran ........................... 714/6.23 |
| 2002/0138762 | A1 | 9/2002 | Horne ........................... 713/201 |
| 2003/0028592 | A1 | 2/2003 | Ooho et al. .................... 709/203 |
| 2003/0204516 | A1 | 10/2003 | Klosterhalfen et al. ....... 707/100 |
| 2005/0131990 | A1 | 6/2005 | Jewell ........................... 709/201 |
| 2005/0165625 | A1 * | 7/2005 | Ladic et al. ........................ 705/2 |
| 2005/0216790 | A1 | 9/2005 | Ohran ............................. 714/15 |
| 2006/0004839 | A1 | 1/2006 | Nagasawa et al. ............. 707/102 |
| 2006/0026218 | A1 | 2/2006 | Urmston ........................ 707/204 |
| 2006/0059384 | A1 | 3/2006 | Helliker ........................... 714/13 |
| 2006/0152899 | A1 | 7/2006 | Wang ............................. 361/685 |
| 2007/0043705 | A1 | 2/2007 | Kaushik et al. ..................... 707/3 |
| 2007/0067399 | A1 | 3/2007 | Kulkarni et al. .............. 709/206 |
| 2007/0143827 | A1 | 6/2007 | Nicodemus et al. .............. 726/2 |
| 2007/0143851 | A1 | 6/2007 | Nicodemus et al. ............ 726/25 |

(Continued)

OTHER PUBLICATIONS

Jon Brodkin, "Amazon cloud uses FedEx instead of the Internet to ship data", *Network World*, Jun. 10, 2010, accessed at <http://www.networkworld.com/news/2010/061010-amazon-cloud-fedex.html>, 2 pp.

(Continued)

*Primary Examiner* — Edward Zee
*Assistant Examiner* — Suman Debnath
(74) *Attorney, Agent, or Firm* — Muirhead and Saturnelli, LLC

(57) ABSTRACT

A backup site and a client are coupled to a network and the backup site obtains backup data for the client using a portable storage device by providing a direct coupling between the portable storage device and the backup site. The portable storage device contains full backup data for the client. The direct coupling is separate from the network. Full backup data is uploaded from the portable storage device to the backup site via the direct coupling. At least one incremental backup, based on the prior full backup, is performed to transfer data from the client to the backup site through the network. The network may be the Internet. The direct coupling may be USB, Firewire, or eSATA. Only a subset of data corresponding to a backup dataset may be provided on the portable storage device. Data on the portable storage device may be encrypted.

19 Claims, 11 Drawing Sheets

U.S. PATENT DOCUMENTS

2008/0154989 A1* 6/2008 Arman .......................... 707/204
2008/0288782 A1  11/2008 Iyer
2010/0070476 A1* 3/2010 O'Keefe et al. .............. 707/640

OTHER PUBLICATIONS

U.S. Appl. No. 12/319,137, filed Dec. 31, 2008, Gordon-Carroll et al.
Tony Patrick, (First Unlimited Online Backup for Mac), Apr. 26, 2007, pp. 1, http://mozy.ie/news/releases/first-unlimited-online-backup-for-the-mac/.
Dorian J. Cougias, (The Backup Book: Disaster Recovery From Desktop to Data Center), 3rd Edition, 2003, pp. 296-300, 305-317, 325, 328-300.
W. Curtis Preston, (Backup & Recovery), O'Reilly Media, Inc., 2007, p. 28.
Marsh Collier, (eBay Timesaving Techniques for Dummies), Wiley Publishing, Inc., 2004, pp. 17-18, 20-21.
Webopedia, (Internet), Dec. 1, 1999, pp. 1-4, http://replay.waybackmachine.org/20010215730151/http://www.webopedia.com/TERM/I/Internet.html.
OnlineBackupSites, (About Carbonite), Jun. 2007, pp. 1-3, http://www.onlinebackupsites.com/CarboniteBG.php.
Webopedia, (Sneakernet), Mar. 12, 2002, pp. 1-2, http://replay.waybackmachine.org/20020820190649/http://www.webopedia.com/TERM/s/sneakernet.html.

* cited by examiner

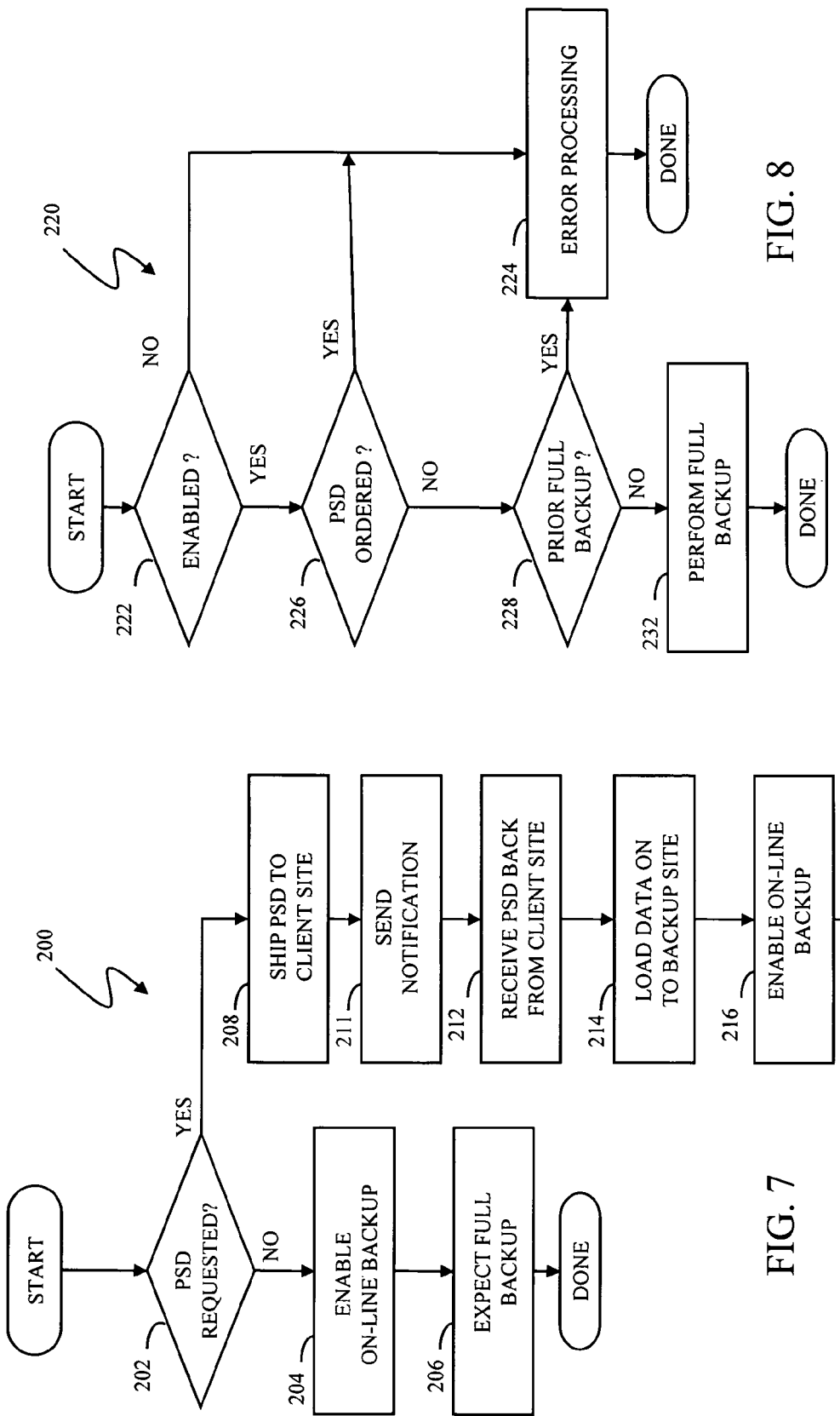

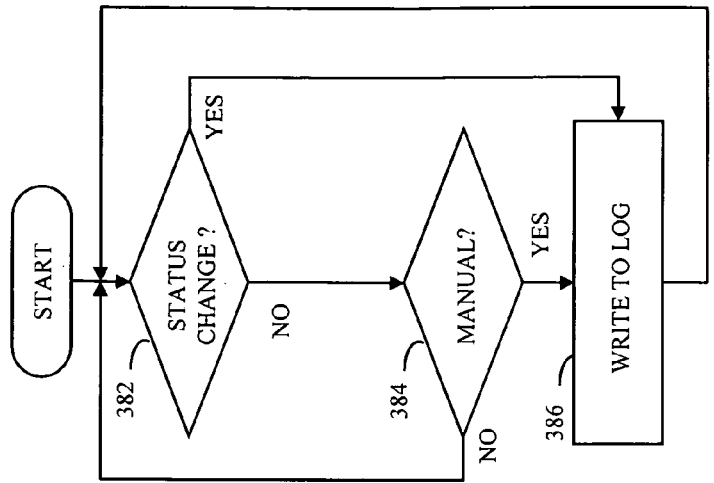
FIG. 14
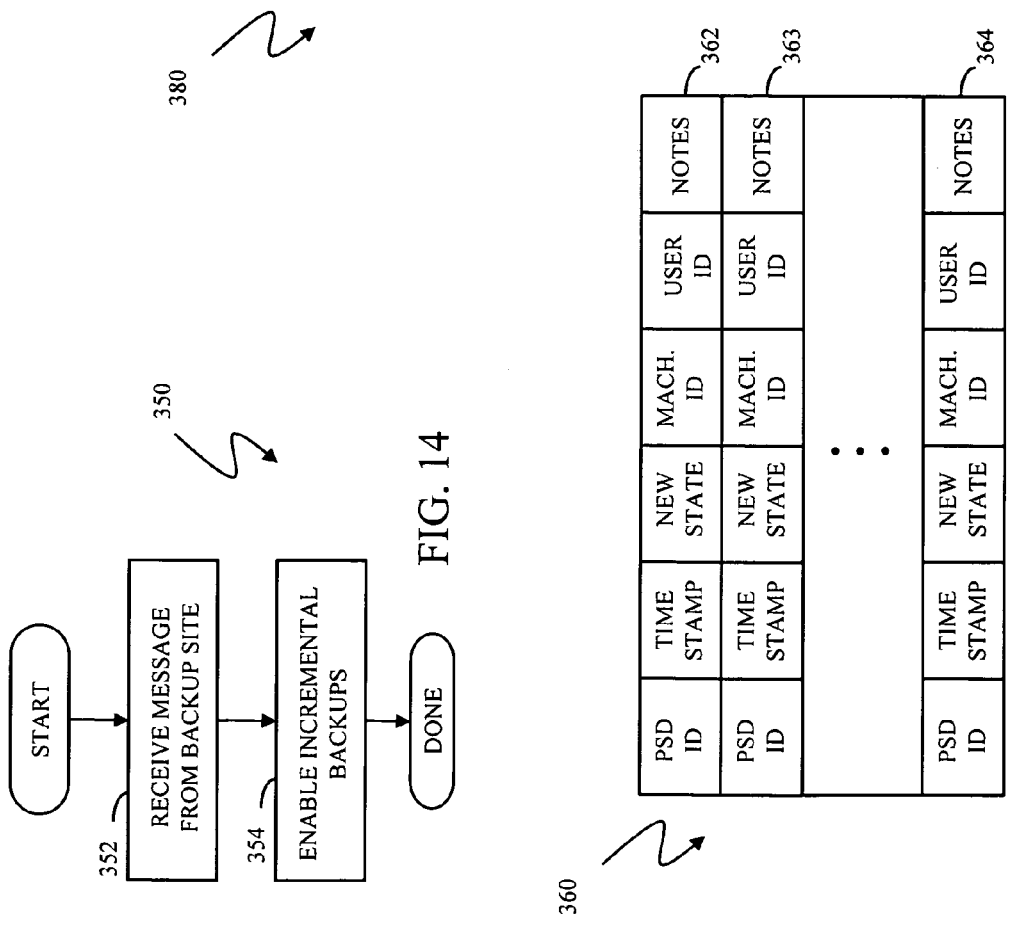
FIG. 15
FIG. 16

OBTAINING BACKUPS USING A PORTABLE STORAGE DEVICE

BACKGROUND OF THE INVENTION

1. Technical Field

This application relates to the field of computer data storage, and more particularly to the field of facilitating providing remote computer data storage over a network.

2. Description of Related Art

Backup systems exist in which data is backed up from one or more clients to a centralized backup site using the Internet or another suitable network. These systems have the advantage of not requiring an administrator to manipulate tapes, disks, or other backup media and also eliminating the need for specialized media I/O devices (e.g., a tape device). One drawback to providing backup over a network is that the network data throughput speed may be relatively slow and/or the amount of data that needs to be backed up may be relatively large so that using a network is impractical.

One way this has been addressed is to use a full/incremental backup system where an initial full backup is first obtained followed by subsequent incremental backups that back up only data that has changed since a prior backup. In many cases, the amount of data that has changed since a prior backup is relatively small, even in instances where the total amount of data for a system is large. Slow networks can handle the throughput for the subsequent incremental backups. However, the initial full backup may still contain a large amount of data and could therefore still pose a problem for a user in terms of the amount of time needed for the initial full backup over the network.

Accordingly, it is desirable to provide a system that has the advantages of backing up data over a network without the corresponding disadvantage of performing the initial full backup over the network.

SUMMARY OF THE INVENTION

According to the system described herein, a backup site and a client are coupled to a network and the backup site obtains backup data for the client using a portable storage device by providing a direct coupling between the portable storage device and the backup site, where the portable storage device contains full backup data for the client and where the direct coupling is separate from the network, uploading the full backup data from the portable storage device to the backup site via the direct coupling, and performing at least one incremental backup from the client to the backup site through the network, where the at least one incremental backup is based on the prior full backup. The network may be the Internet. The direct coupling may be USB, Firewire, or eSATA. Only a subset of data corresponding to a backup dataset may be provided on the portable storage device. Data on the portable storage device may be encrypted. A portion of the data may be encrypted with a first key that is known at the backup site and another portion of the data may be encrypted with a second key that is not known at the backup site. Prior to providing a direct coupling between the portable storage device and the backup site, the portable storage device may be shipped from the client to the backup site. Prior to being shipped from the client to the backup site, the portable storage device may be provided to the client from the backup site. A user may order the portable storage device. Prior to the portable storage device being provided to the client from the backup site, the portable storage device may be correlated with the client at the backup site.

According further to the system described herein, computer software, provided in a computer-readable medium, obtains, at a backup site, backup data from a client using a portable storage device. The backup site and the client are coupled to a network. The software includes executable code that uploads full backup data for the client from the portable storage device to the backup site via a direct coupling between the portable storage device and the backup site, where the direct coupling is separate from the network and executable code that causes at least one incremental backup to be performed from the client to the backup site through the network, wherein the at least one incremental backup is based on the prior full backup. The network may be the Internet. The direct coupling may be USB, Firewire, or eSATA. Only a subset of data corresponding to a backup dataset may be provided on the portable storage device. Data on the portable storage device may be encrypted. A portion of the data may be encrypted with a first key that is known at the backup site and another portion of the data may be encrypted with a second key that is not known at the backup site.

According further to the system described herein, a system that backs up data includes a network, a backup site, coupled to the network to receive data from at least one client, and a portable storage device that contains full backup data from the at least one client and provides the full backup data to the backup site, where at least one incremental backup is performed from the at least client to the backup site through the network after providing full backup data to the backup site and where the at least one incremental backup is based on the prior full backup. The network may be the Internet. The portable storage device may be coupled to the backup site via a direct coupling using USB, Firewire, or eSATA and the direct coupling between the portable storage device and the backup site may be separate from the network. The portable storage device may be correlated with the client.

According further to the system described herein, backing up data from a client includes providing a direct coupling between the client and a portable storage device, copying full backup data from the client to the portable storage device using the direct coupling, and performing at least one incremental backup from the client to the backup site through a network that is separate from the direct coupling, where the at least one incremental backup is based on the prior full backup. The network may be the Internet. Following copying full backup data to the portable storage device, the portable storage device may be shipped from the client to the backup site. The direct coupling may be USB, Firewire, or eSATA. Only a subset of data corresponding to a backup dataset may be copied from the client to the portable storage device. Prior to copying full backup data to the portable storage device, the portable storage device may be shipped from a backup site to the client. A user at the client may order the portable storage device. Prior to the portable storage device being shipped, the portable storage device may be correlated with the client. Prior to copying full backup data to the portable storage device, the correlation between the portable storage device and the client may be confirmed.

According further to the system described herein, computer software, provided in a computer-readable medium, backs up data from a client. The software includes executable code that copies full backup data from the client to a portable storage device using a direct coupling between the client and the portable storage device and executable code that performs at least one incremental backup from the client to a backup site through a network that is separate from the direct coupling, where the at least one incremental backup is based on the prior full backup. The network may be the Internet. The direct coupling may be USB, Firewire, or eSATA. Only a subset of data corresponding to a backup dataset may be copied from the client to the portable storage device. The computer software may also include executable code that correlates the portable storage device with the client. The computer software may also include executable code that confirms the correlation between the portable storage device and the client. Executable code that copies full backup data to the portable storage device may be provided by an agent that is part of the client.

According further to the system described herein, a system that backs up data at a client includes at least one client, coupled to a network to communicate with a backup site via a network and a portable storage device that receives full backup data from the client via a direct coupling that is separate from the network, where at least one incremental backup is performed to provide data to the backup site through the network after providing the full backup data to portable storage device and wherein the at least one incremental backup is based on the prior full backup. The network may be the Internet. The direct coupling may be USB, Firewire, or eSATA. The portable storage device may be correlated with the client.

BRIEF DESCRIPTION OF DRAWINGS

Embodiments of the system are described with reference to the several figures of the drawings, noted as follows.

FIG. 7 is a flow chart illustrating steps performed at a backup site in connection with initiating backups according to an embodiment of the system described herein.

FIG. 8 is a flow chart illustrating steps performed at a backup site in connection with a client providing a full backup according to an embodiment of the system described herein.

FIG. 14 is a flow chart illustrating steps performed at a client site in connection with unfreezing (enabling) incremental backups according to an embodiment of the system described herein.

FIG. 15 is a schematic diagram illustrating an event log table according to an embodiment of the system described herein.

FIG. 16 is a flow chart illustrating steps performed in connection with logging an event in an event log table according to an embodiment of the system described herein.

DETAILED DESCRIPTION OF VARIOUS EMBODIMENTS

Figure 1:
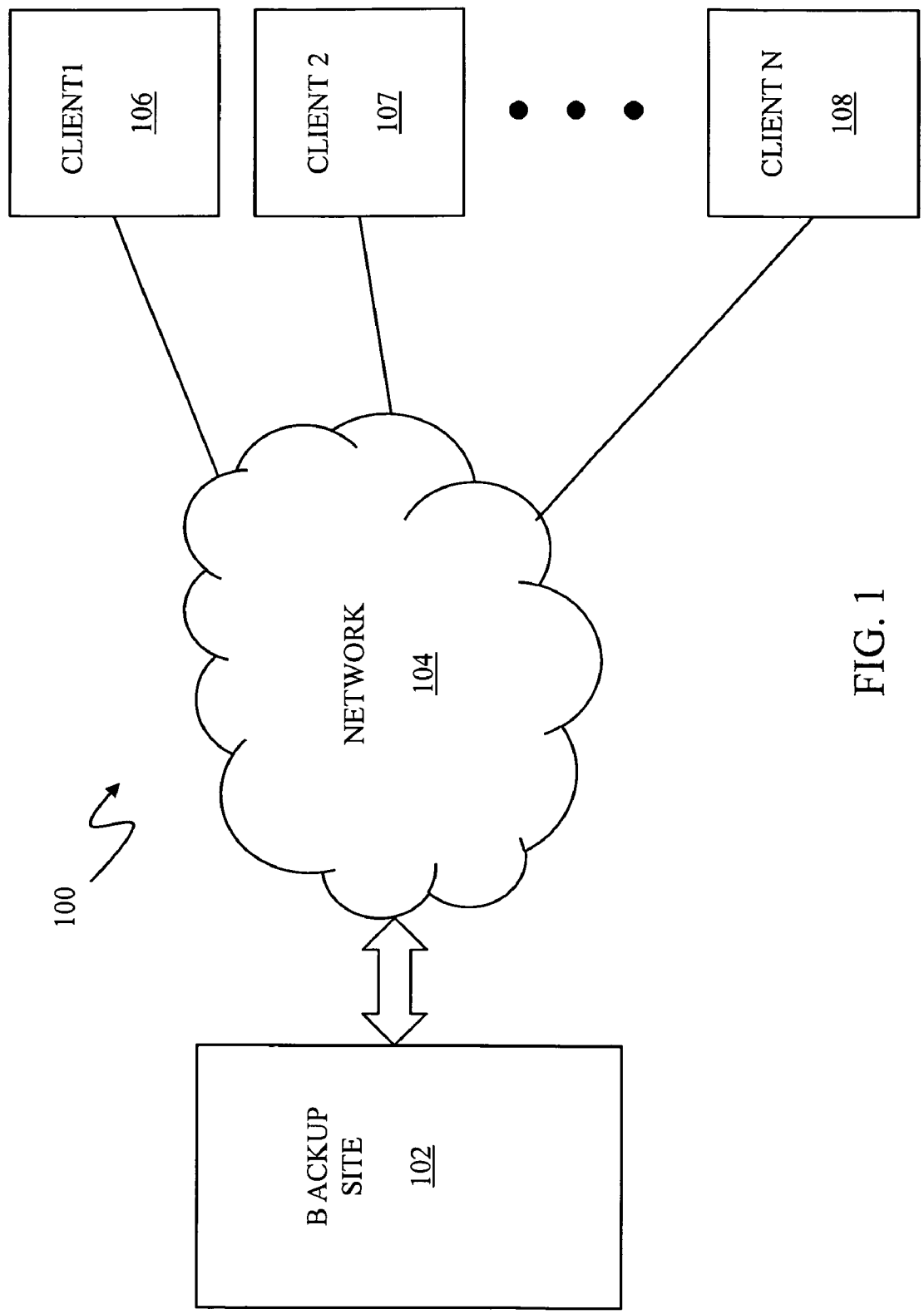
FIG. 1 is a schematic diagram illustrating a system that includes a backup site, a network, and a plurality of clients according to an embodiment of the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a system 100 includes a backup site 102, a network 104, and a plurality of clients 106-108. The backup site 102 and the clients 106-108 are all coupled to the network 104, which may be any type of network, such as the Internet, for interconnecting computer data devices. As described in more detail elsewhere herein, each of the clients 106-108 uses the network 104 to provide backup data to the backup site 102. Note that, although only three clients are shown in FIG. 1, the system 100 may accommodate any number of clients for which the backup site 102 can provide the functionality described herein. Each of the clients may be geographically separated from the backup site.

Initially, each of the clients 106-108 may provide a full backup to the backup site 102 followed by providing incremental backups. Incremental backups represent changes in the data since the last backup so that, in effect, the incremental backup is based on the full backup and the data may be recreated using the full backup and the incremental backup (s). Full backups and incremental backups are known. For the system described herein, any appropriate full/incremental backup technique may be used. Note that it is possible to backup all of the data of one of the clients 106-108 or a subset thereof. The subset of data may be referred to as a "backup dataset". Thus, it should be understood that discussion herein of a full or incremental backup refers to a full or incremental backup of the backup dataset.

Figure 2:
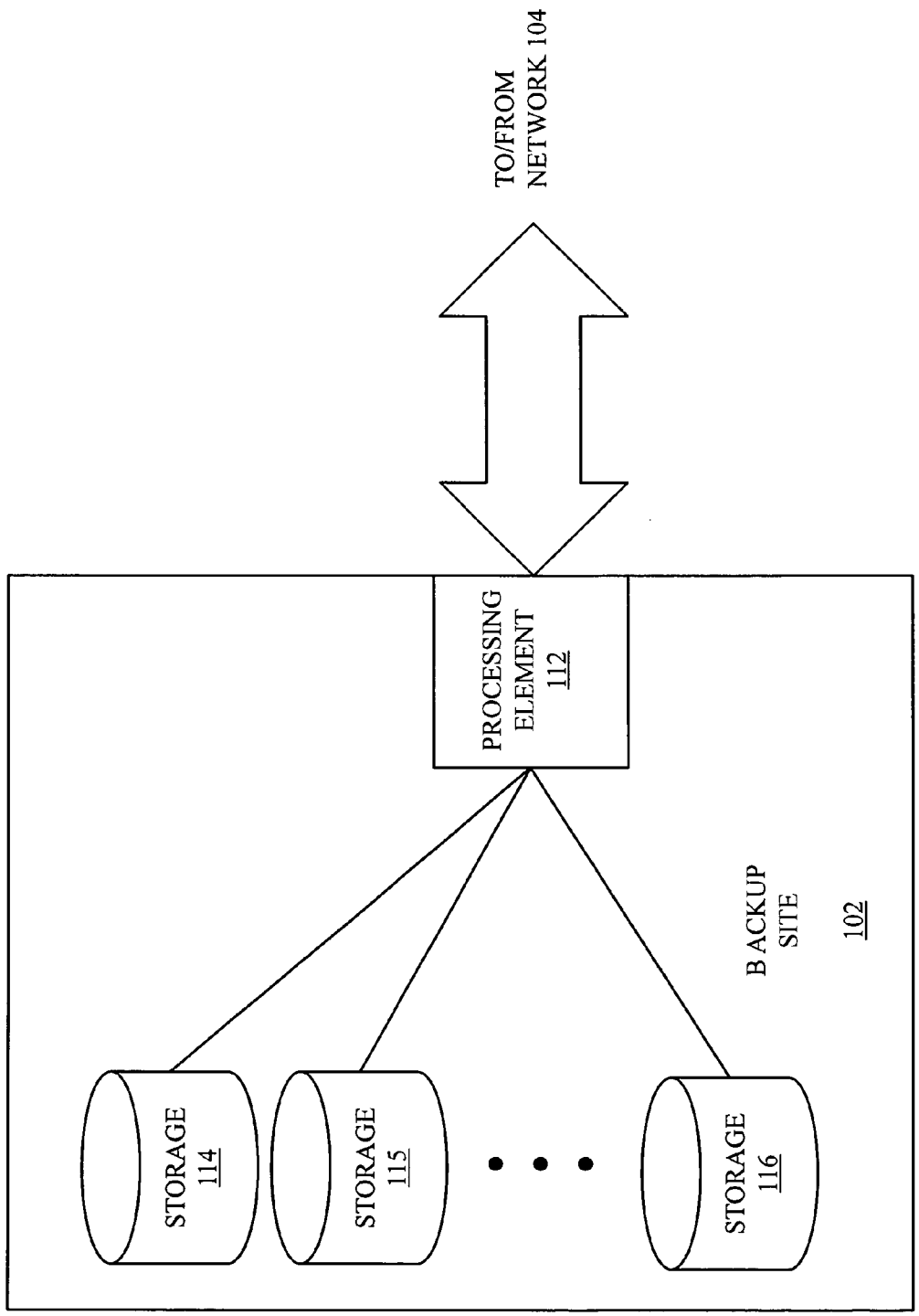
FIG. 2 is a schematic diagram illustrating a backup site in more detail according to an embodiment of the system described herein.

Referring to FIG. 2, the backup site 102 is shown in more detail as including processing element 112 and a plurality of storage areas 114-116. The processing element 112 represents any appropriate processing capable of providing the functionality described herein, such as a conventional microprocessor, a stand-alone computer, a processing blade, etc. The processing element 112 handles communication with the network 104 and manipulating data on the storage devices 114-116. Note that although a single processing element 112 is shown in FIG. 2, the backup site 102 may be implemented using any number of processing elements and storage areas (separate and/or integrated to at least some degree). In some embodiments, components of the backup site 102 may be geographically and/or logically separated. Generally, the backup site 102 may be implemented using any appropriate combination of hardware and software capable of providing the functionality described herein. In an embodiment, the backup site 102 is implemented using server farm technology.

The storage areas 114-116 represent different sections of storage of the backup site used to store data backed up from the clients 106-108. Each of the sections 106-108 may represent a file, a group of files, a logical storage device, a physical storage device, and/or any other appropriate unit for storing and separating data. Each of the storage areas 114-116 may store a full backup and subsequent incremental backups for one of the clients 106-108. The processing element 112 receives backup data for the backup site 102 via the network 104 and stores the backup data on the storage devices 114-116.

Figure 3:
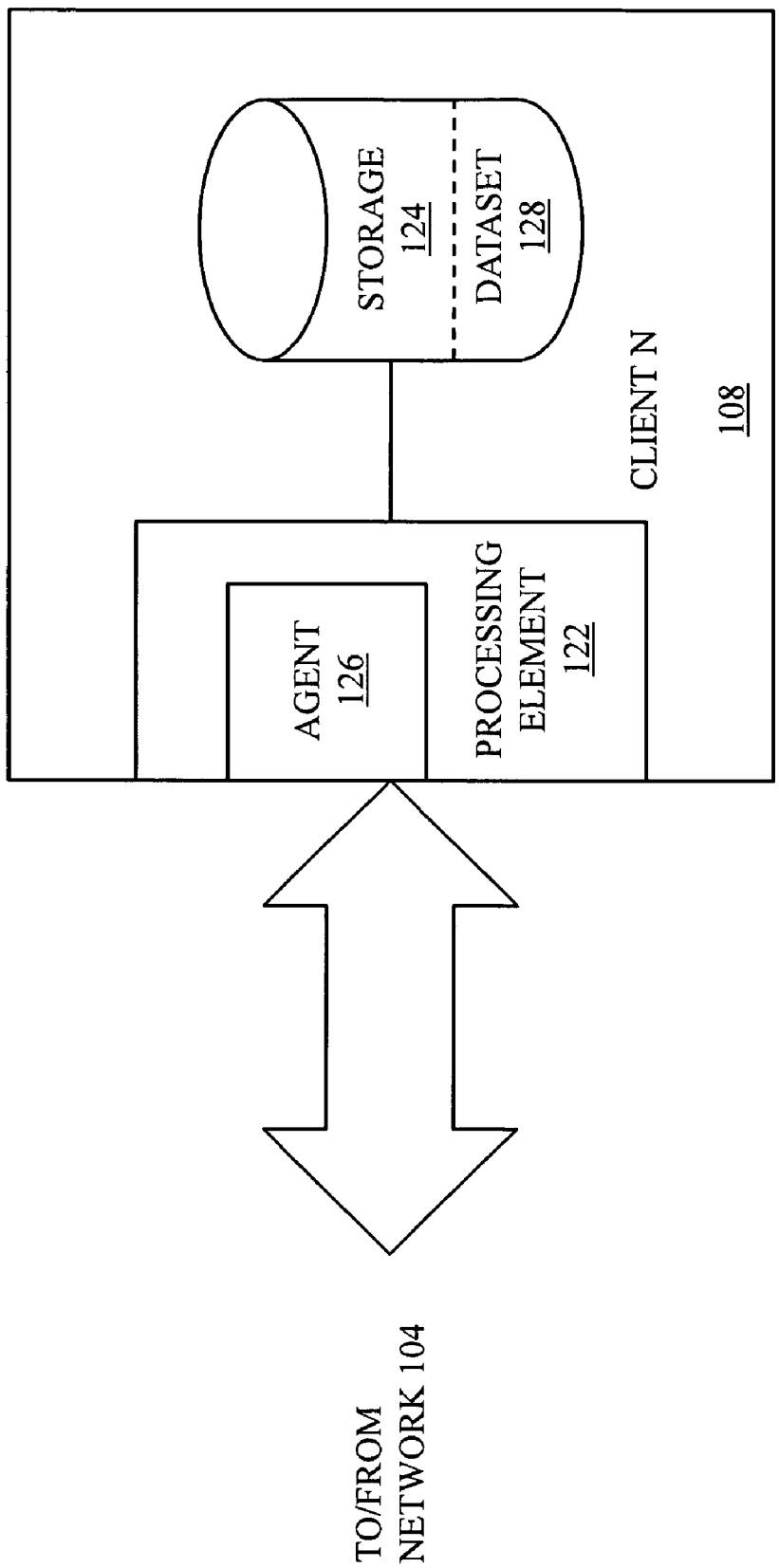
FIG. 3 is a schematic diagram illustrating a client in more detail according to an embodiment of the system described herein.

Referring to FIG. 3, the client 108 is shown in more detail as including its own processing element 122 and a storage area 124. The client 108 may represent a single computer, a plurality of interconnected computers, and/or any other unit or collection of processors that may be grouped for purposes of the system described herein. The processing element 122 may be implemented using one or more of the processors of the client 108. A standalone processing unit may also be referred to herein as a "machine". The storage area 124 may be any system capable of providing computer data storage functionality, including disk storage, solid state memory storage, flash memory, etc.

The processing element 122 may include an agent 126 (e.g., a software module) that handles providing the functionality described herein, including providing data from the storage 124 to the backup site 102 via the network 104. The processing element 122 may be implemented using any appropriate processing system and the processing agent 126 may be implemented using software and/or a combination of software and specialized hardware. In some embodiments, the processing agent 126 may be downloaded by the client 108 from the backup site 102 via the network 104. Of course, any appropriate mechanism may be used to provide the processing agent 125 to the client 108. Note also that it is possible for different ones of the clients 106-108 to use the same mechanism or different mechanisms.

The storage 124, which provides storage functionality for the client 108, includes a backup dataset 128, which represents a portion of the storage 124 that is being backed up to the backup site 102. In some cases the backup dataset 128 corresponds to a subset of the storage 124 while in other cases it is possible for the backup dataset 128 to correspond to the entirety of the storage 124. As described in more detail elsewhere herein, in some instances it is possible for a user to select a portion of the storage 124 to become the backup dataset 128.

Figure 4:
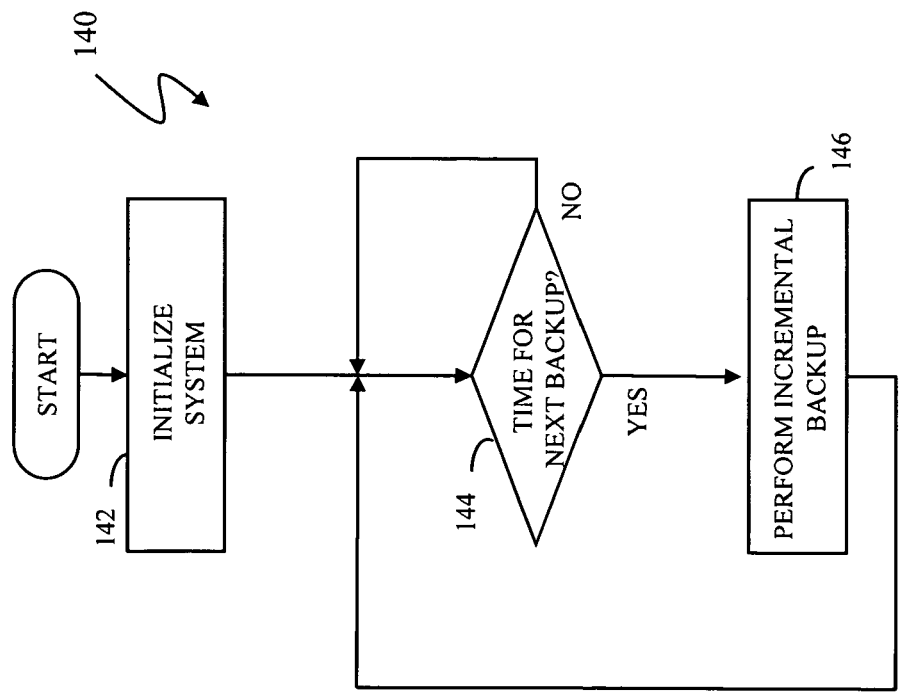
FIG. 4 is a flow chart illustrating steps performed in connection with operation of the system according to an embodiment of the system described herein.

Referring to FIG. 4, a flow chart 140 illustrates processing by the client for performing backups according to the system described herein. Processing begins at a first step 142 where the system is initialized. Initializing the system at the step 142 may include providing a full backup copy of the backup dataset from the client to the backup site. Providing a full backup copy is described in more detail elsewhere herein. Following the step 142 is a test step 144 where it is determined if it is time to perform an incremental backup. As discussed in more detail elsewhere herein, the system initially provides a full backup of the backup dataset followed by incremental backups. In some instances, the incremental backups may be performed periodically, in which case the test at the step 144 may determined if an amount of time corresponding to the period has passed. In other instances, incremental backups may be user initiated, in which case the test at the step 144 may determine if the user has requested a backup. Generally, the test at the step 144 depends upon the mechanism used to initiate incremental backups.

As long as it is determined at the step 144 that it is not time to initiate an incremental backup, then control loops back to the test step 144 and the system continues to poll. Otherwise, if it is time for an incremental backup, then control transfers from the test step 144 to a step 146 where the incremental backup is performed. In an embodiment herein, the incremental backup may be performed at the step 146 by the agent 126, which copies data from the dataset 128 to the backup site 102 via the network 104. The incremental backup copies data that has changed since a previous backup. Following the step 146, control transfers back to the step 144 for another iteration.

Although it is possible to provide the initial full backup over the network 104, in some cases this may not be desirable. For instance, when the connection to the network is relatively slow, and/or the amount of data is relatively large, the amount of time needed to perform initialization at the step 142 may be unacceptably large. Accordingly, the system described herein uses an alternative mechanism to perform the initial full backup of the backup dataset 128.

Figure 5:
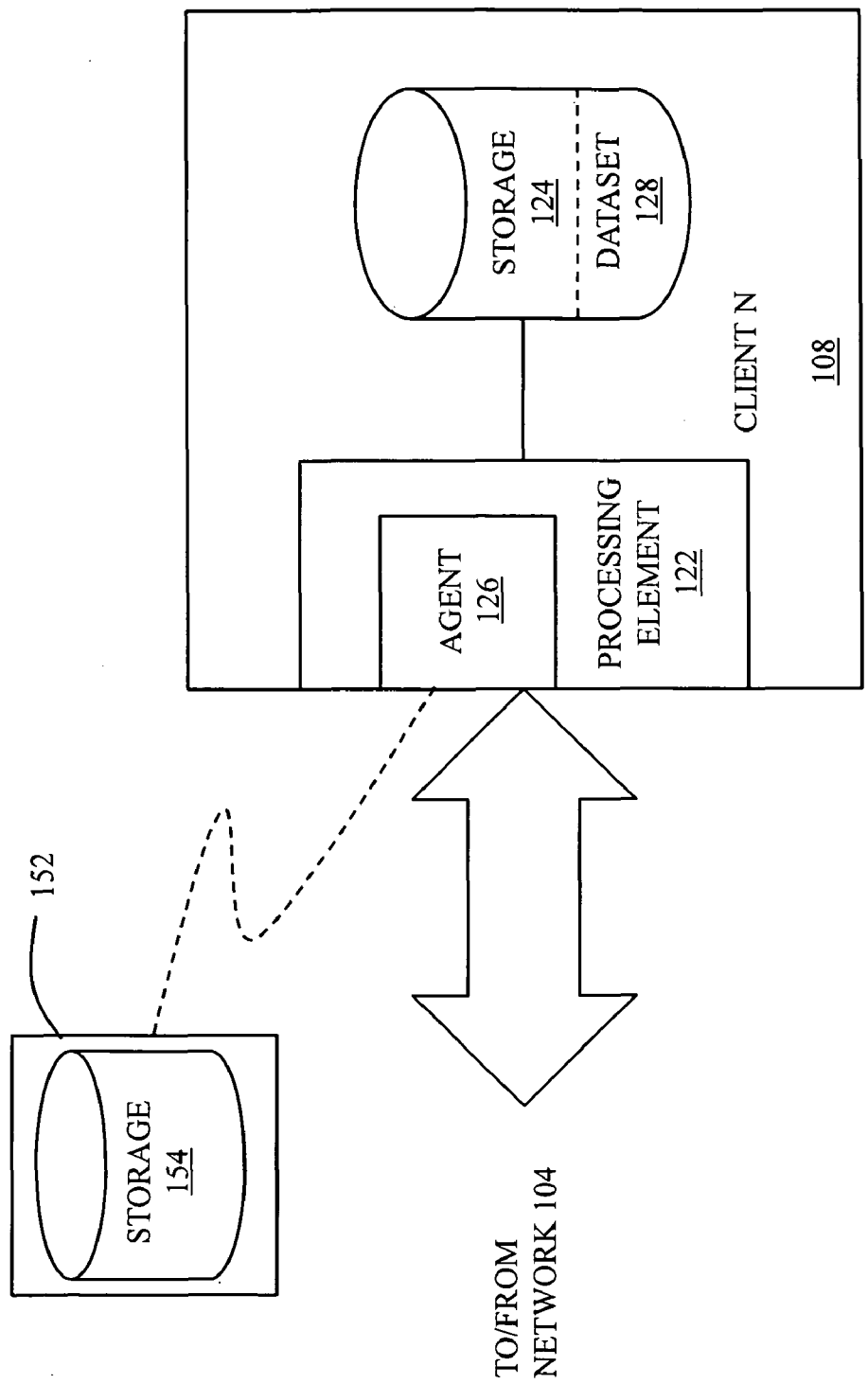
FIG. 5 is a schematic diagram illustrating portable storage device coupled to a client according to an embodiment of the system described herein.

Referring to FIG. 5, the client 108 is shown directly coupled (i.e., not through the network 104) to a portable storage device 152. The portable storage device 152 includes its own storage area 154 that may be implemented using any system capable of providing computer data storage functionality, including disk storage, solid state memory storage, flash memory, etc. The portable storage device may be provided by any storage system capable of being coupled to the client 108 and (as described elsewhere herein) to the backup site 102 and transported therebetween. The portable storage device 152 may contain processing capabilities (not shown) and may be coupled to the client 108 using any appropriate mechanism, including USB, firewire, and/or eSata.

As part of the initialization step 142, discussed above, the portable storage device 152 may be coupled to the client 108 to allow the agent 126 to perform a full backup to the portable storage device 152 instead of performing the full backup using the network 104. The data transfer rate between the client 108 and the portable storage device 152 may be much faster than the data transfer rate through the network 104, thus making it advantageous to provide the full backup directly to the portable storage device 152.

Figure 6:
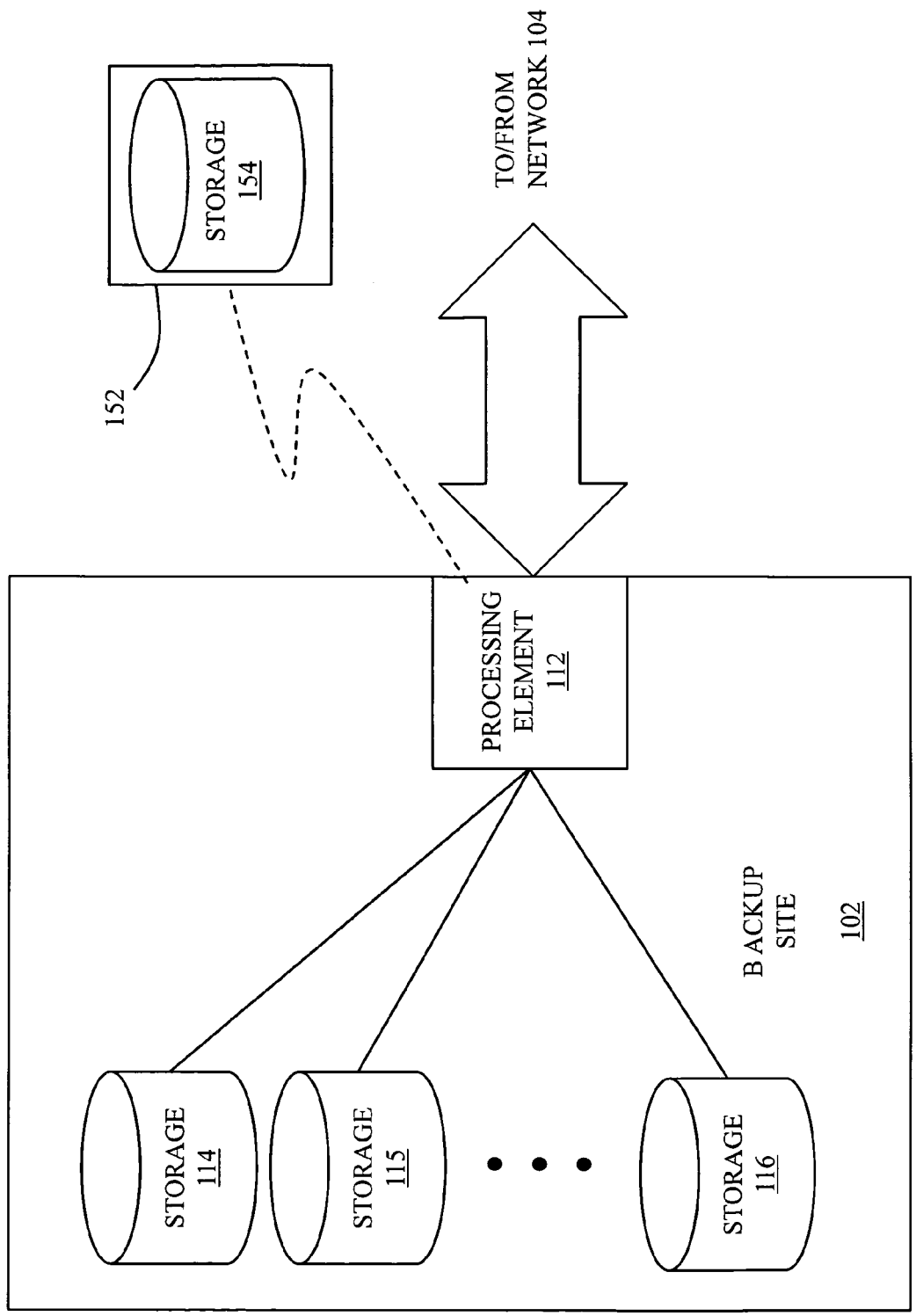
FIG. 6 is a schematic diagram illustrating portable storage device coupled to a backup site according to an embodiment of the system described herein.

Referring to FIG. 6, the backup site 102 is shown directly coupled (i.e., not through the network 104) to the portable storage device 152. Data from the previous full backup (from the client 108 to the portable storage device 152) is copied from the portable storage device 152 to the backup site 102 as part of the initialization step 142, discussed above. Once the data from the full backup is copied to the backup site 102, then the system is placed in a state similar, if not identical, to the state of the system as if the initial full backup had been performed using the network 104. This process is described in more detail elsewhere herein.

Referring to FIG. 7, a flow chart 200 illustrates steps performed at the backup site 102 in connection with a user at a client site initiating backup services. In an embodiment herein, the backup site 102 may be part of a commercial enterprise that provides backup services to clients for a charge (e.g., based on the amount of data, frequency of backups, etc.). The clients may be unrelated, and the backup site 102 segregates the data from the different clients in the different storage areas 114-116. Of course, the system described herein is also applicable to instances where there is not a commercial relationship between the various entities.

Processing begins at a first test step 202 where it is determined if a user at a new client has requested performing an initial backup using a portable storage device. In an embodiment herein, a user may have an option to perform an initial full backup either using a portable storage device or from the client to the backup site through the network. In instances where the amount of data is relatively small and/or the connection using the network is relatively fast, a user may decide to perform an initial full backup through the network. Otherwise, a user may decide to use a portable storage device for the initial full backup. In a commercial setting, there may be an additional cost associated with using a portable storage device.

If it is determined at the test step 202 that a user has not requested a portable storage device, then control transfers from the test step 202 to a step 204 where the backup site enables on-line backup functionality for the new client. Enabling on-line backup indicates that the backup site is receiving backup data from client via the network. Following the step 202 is a step 204 where the backup site enters a state in which the backup site expects full backup data from the new client. Following the step 204, processing is complete.

If it determined at the test step 202 that a user has requested a portable storage device, then control passes from the test step 202 to a step 208 where a PSD is shipped to a client site. The processing performed at the step 208 is described in more detail elsewhere herein. Following the step 208 is a step 211 where notification is sent to the client site to indicate that a PSD has been shipped. In an embodiment herein, the notification may be in the form of an email message, but of course any appropriate notification mechanism may be used.

Following the step 211 is a step 212 where the PSD (containing full backup data) is received back from the client. Following the step 212 is a step 214 where the data for the full backup is transferred from the portable storage device to the backup site. Note that, in connection with the step 214, the portable storage device may be coupled to one of the servers at the backup site using the same type of connection used to couple the portable storage device to the client. In other instances, the portable storage device may be coupled to the backup site using a different mechanism altogether. Following the step 214 is a step 216 where on-line backup is enabled at the backup site for the new client. Following the step 216, processing is complete.

Referring to FIG. 8, a flow chart 220 illustrates processing performed at the backup site 102 in connection with receiving a request/data from the client for a full backup of the client to the backup site 102 using the network 104. Processing begins at a first test step 222 where it is determined if on-line backup is enabled for the client. There may be many reasons why on-line backup is not enabled for a particular client. For example, in a commercial setting, on-line backup may not be enabled if a client has not signed up for a paid subscription or has let an existing paid subscription expire. If it is determined at the test step 222 that on-line backup is not enabled for the client, then control passes from the test step 222 to a step 224 where error processing is performed. The error processing performed at the step 224 may include any appropriate mechanism that handles the error condition, such as providing a text message to a user or calling process indicating the nature of the error. Following the step 224, processing is complete.

If it is determined at the step 222 that on-line backup is enabled, then control transfers from the step 222 to a test step 226 where it is determined if the particular client has ordered a PSD. If so, then performing a full backup over the network 104 is inappropriate, and control transfers from the test step 226 to the step 224 to perform error processing. In other embodiments, it may be possible to both order a PSD and perform a full backup on-line. For example, a user may order the PSD and begin the on-line backup at the same time and, if the on-line backup ends before the user receives the PSD, then the PSD is not used. In such a case, the step 216 where on-line backup is enabled may be performed prior to the step 212 where the PSD is received back from the client site.

If it is determined at the test step 226 that a user has not ordered a PSD, then control transfers from the test step 226 to a test step 228 where it is determined if a full backup already exists at the backup site 102. If so, then control transfers from the test step 228 to the step 224 to perform error processing. Otherwise, control transfers from the test step 228 to a step 232 where the full backup is performed from the client to the backup site 102 via the network 104. Following the step 232, processing is complete. Note that, in other embodiments, it may be possible to overwrite an old full backup with a new full backup (i.e., start over). In such a case, then if it is determined at the step 228 that a full backup already exists, then the old full backup would be deleted and then processing would proceed to the step 232 for the new full backup.

Figure 9:
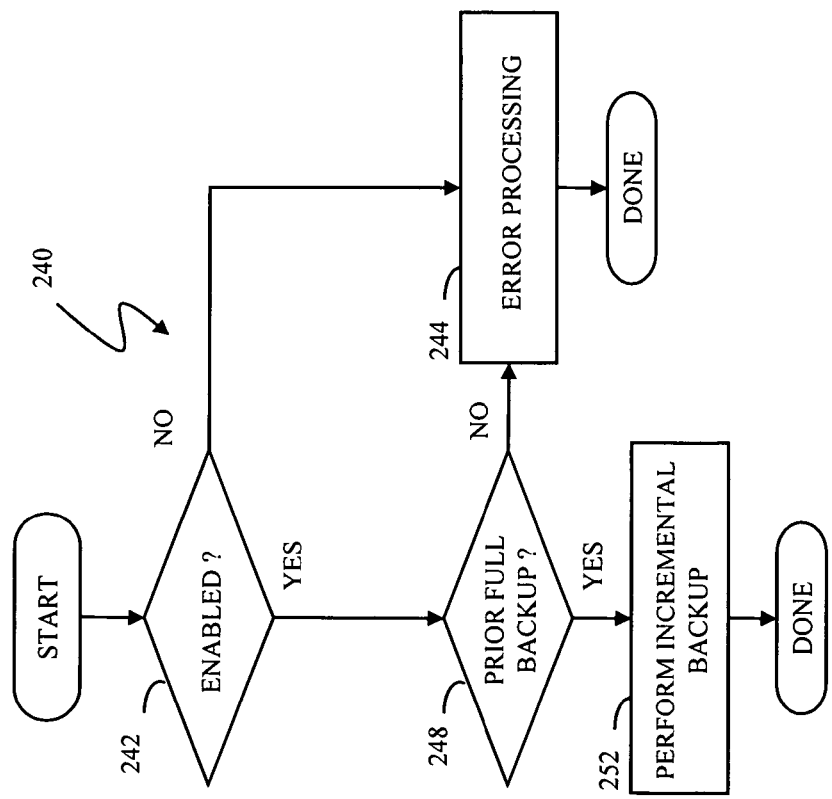
FIG. 9 is a flow chart illustrating steps performed at a backup site in connection with a client providing an incremental backup according to an embodiment of the system described herein.

Referring to FIG. 9, a flow chart 240 illustrates processing performed at the backup site 102 in connection with receiving a request/data from the client for an incremental backup of the client to the backup site 102 using the network 104. Processing begins at a first test step 242 where it is determined if on-line backup is enabled for the client. If not, then control passes from the test step 242 to a step 244 where error processing is performed, similar to other error processing discussed herein. Following the step 244, processing is complete.

If it is determined at the step 242 that on-line backup is enabled, then control transfers from the test step 242 to a test step 248 where it is determined if a prior full backup already exists. If not, then it is not appropriate to perform an incremental backup and control transfers from the test step 248 to the step 244 to perform error processing. Otherwise, control transfers from the test step 248 to a step 252 to perform the incremental backup. Following the step 252, processing is complete.

Figure 10:
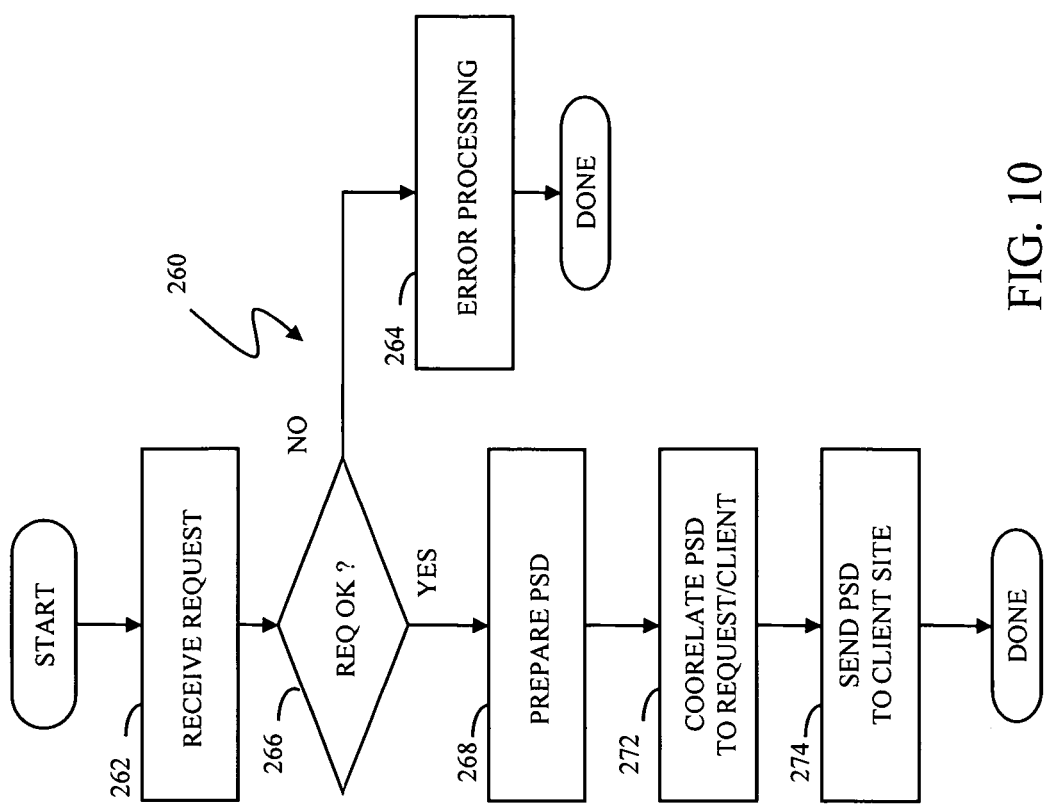
FIG. 10 is a flow chart illustrating steps performed at a backup site in connection with fulfilling a request for a portable storage device according to an embodiment of the system described herein.

Referring to FIG. 10, a flow chart 260 illustrates in more detail the step 208 of the flowchart 200, discussed above, where a PSD is provided to a client site. Processing begins at a first step 262 where a request is received from a user at the client site. The request may be provided using any one of a number of techniques, including providing the request on-line via a Web browser. The request may specify the amount of storage and/or the connection type (e.g., USB, Firewire, eSATA, etc.). In a commercial setting, the request for a PSD may be provided with a request/payment for the backup service.

Following the step 262 is a test step 264 where it is determined if the request for a PSD is acceptable. There may be many reasons why a request is unacceptable. For example, second and subsequent requests by the same client may be unacceptable. Also, in a commercial setting, the request may be limited by the amount of backup storage space purchased for a client. If it is determined at the test step 264 that the request is not acceptable, then control transfers from the test step 264 to a step 266 where error processing is performed, similar to other error processing discussed herein. Following the step 266, processing is complete.

If it is determined at the step 264 that the request is acceptable, then control transfers from the step 264 to a step 268 where the PSD is prepared. In an embodiment herein, the PSD may be prepared by formatting the drive and including appropriate information thereon for the client. In some instances, the PSD may be bar coded and data indicating the bar code may be written to the PSD.

Following the step 268 is a step 272 where the PSD is correlated to the request/client. Correlating the PSD to the request/client may include maintaining information at the backup site that associates the specific PSD with the specific client that requested the PSD (using, for example, a bar code provided on the PSD). Correlation of the PSD to the client/ request allows the backup site to monitor which PSD have been returned for which clients. Following the step 272 is a step 274 where the PSD is sent to the client site using, for example, a commercial shipping service. Following the step 274, processing is complete.

Figure 11:
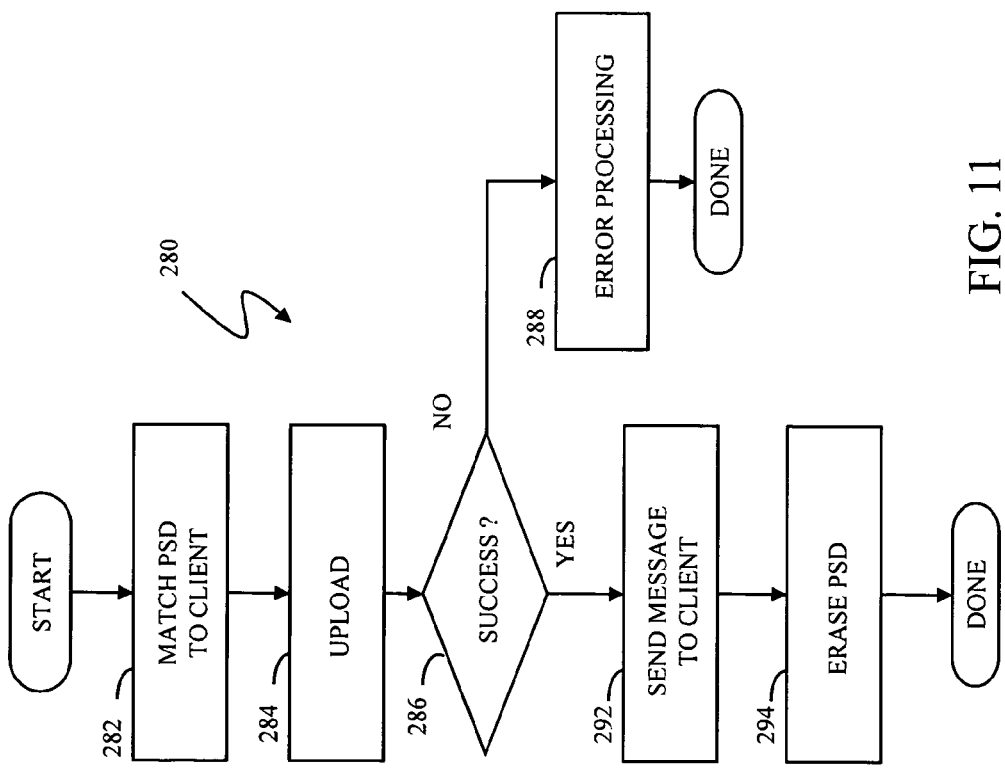
FIG. 11 is a flow chart illustrating steps performed at a backup site in connection with receiving a portable storage device and uploading data therefrom according to an embodiment of the system described herein.

Referring to FIG. 11, a flow chart 280 illustrates in more detail steps performed at the backup site in connection with handling a PSD from a client that contains a full backup. Processing begins at a first step 282 where the PSD is matched to the client for which the PSD had been ordered. Matching at the step 282 may be facilitated by prior correlation of the PSD with the client prior to shipping the PSD to the client site. Following the step 282 is a step 284 where the PSD full backup data is uploaded from the PSD to the backup site 102. Optionally, a notification (e.g., email notification) is sent to the client in connection with this.

In an embodiment herein, it may be possible to begin to perform the initial full backup using the Internet, suspend (cancel) the Internet full backup, and then finish whatever remains of the full backup using the portable storage device. In such a case, the processing illustrated by the flow chart 200 of FIG. 7 may be modified to allow for both on-line full backup and using the portable storage device. The processing illustrated by the flow chart 220 of FIG. 8 may be changed in a similar manner and, of course, uploading at the step 284 may simply append data from the portable storage device.

Following the step 284 is a test step 286 where it is determined if the full backup data has been successfully uploaded to the backup site 102. If not, then control transfers from the test step 286 to a step 288 where error processing is performed, similar to other error processing discussed herein. Following the step 288, processing is complete.

If it is determined at the test step 286 that the full backup data has been successfully uploaded from the PSD to the backup site 102, then control transfers from the step 286 to a step 292 where a message (e.g., electronic signal, email message, etc.) is sent to the client indicating a successful upload. Use of the message at the client site is discussed in more detail elsewhere herein. Following the step 292 is a step 294 where the PSD is erased. Erasing the PSD at the step 294 facilitates reuse thereof. Following the step 294, processing is complete.

Figure 12:
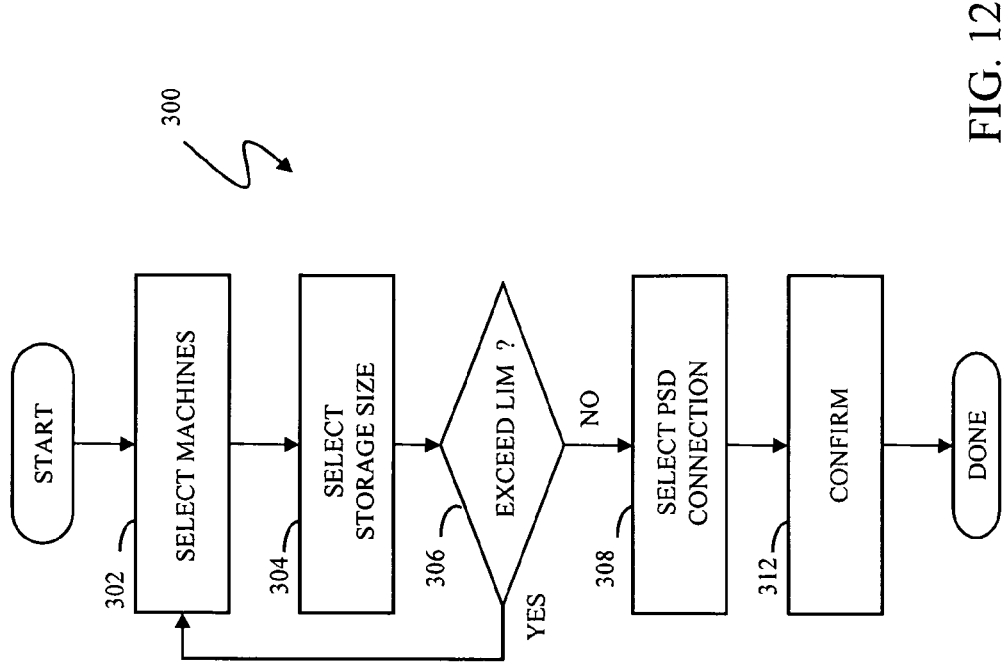
FIG. 12 is a flow chart illustrating steps performed at a client site in connection with ordering a portable storage device for a full backup according to an embodiment of the system described herein.

Referring to FIG. 12, a flow chart 300 illustrates ordering a PSD at a client site. The software that performs at least some of the steps illustrated in the flow chart 300 may be part of the agent 126, discussed above. Processing begins at a first step 302 where a user at a client site selects machines (clients) for which the PSD is being ordered. Following the step 302 is a step 304 where the user at the client site selects the amount of storage space needed. Note that it is also possible to automatically calculate the storage amount needed based on the machines selected at the step 302. Following the step 304 is a test step 306 where it is determined if any limits have been exceeded. For example, the amount of storage space needed may exceed the available sizes for the PSDs. In the case of a commercial implementation, other limits may relate to the number of client licenses and/or the amount of storage purchased by a user.

If it is determined at the test step 306 that a limit related to the number of machines, storage size, etc. has been exceeded, then control transfers from the test step 306 back to the step 302 to begin again by selecting the number of machines and storage size. Otherwise, control transfers from the test step 306 to a step 308 where the user selects a PSD connection type (e.g., USB, Firewire, eSATA, etc.). Following the step 308 is a step 312 where the user at the client site confirms the order. Following the step 312, processing is complete.

Figure 13:
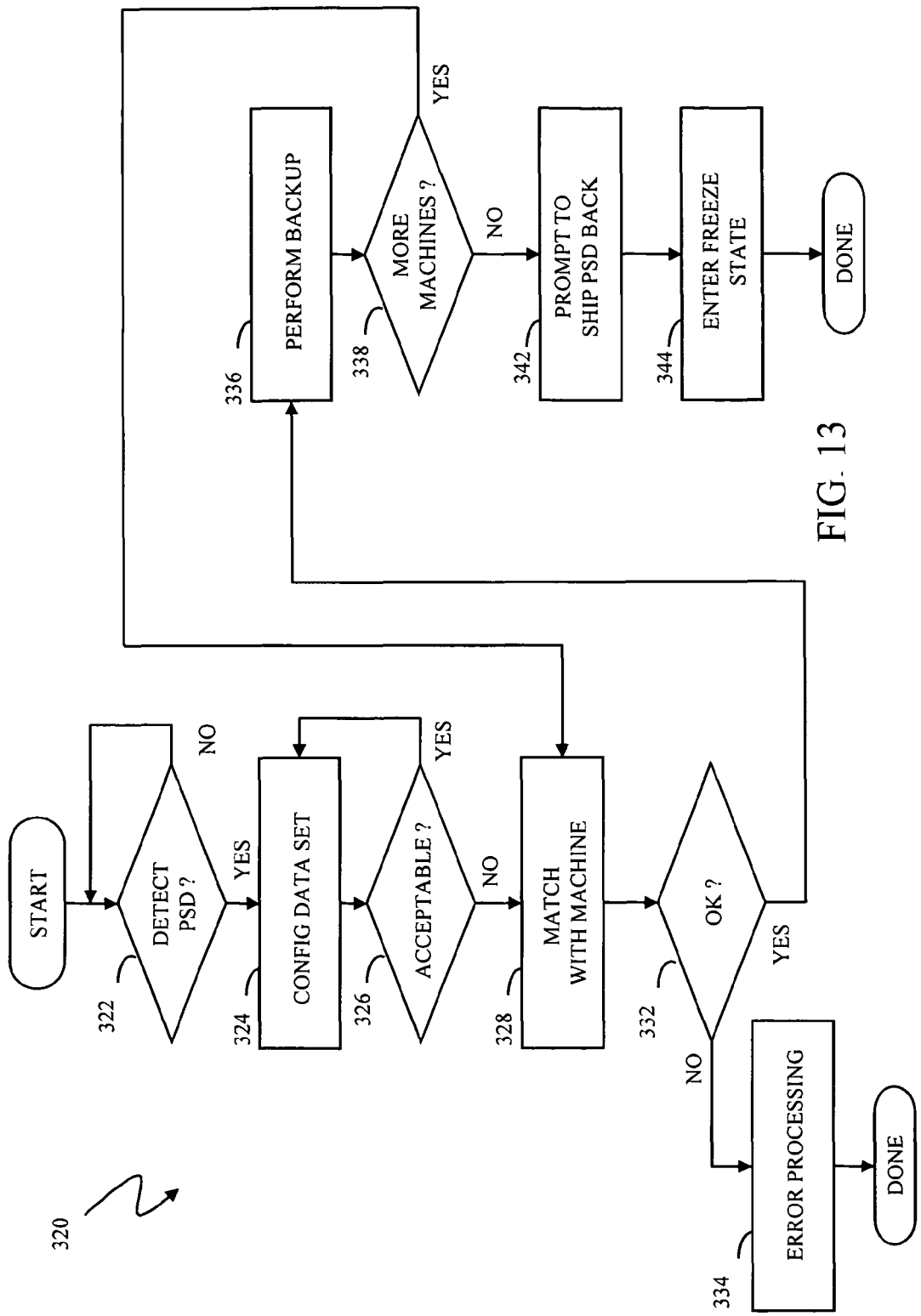
FIG. 13 is a flow chart illustrating steps performed at a client site in connection with providing a full backup to a portable storage device according to an embodiment of the system described herein.

Referring to FIG. 13, a flow chart 320 illustrates steps performed at the client in connection with receiving and backing up data to the PSD. The software that performs at least some of the steps illustrated in the flow chart 320 may be part of the agent 126, discussed above. Processing begins at a first test step 322, which represents waiting to detect the presence of the PSD. The client essentially polls until the PSD is present. Accordingly, the test at the step 322 determines if the PSD has been detected and, if not, loops back to continue to poll.

If it is determined at the step 322 that that a PSD has been detected, then control transfers from the test step 322 to a step 324 where the user configures one or more backup datasets on each of the machines for which backups are being performed. Following the step 324 is a test step 326 where it is determined if the backup dataset(s) configured at the step 324 are acceptable. Backup dataset(s) may be unacceptable for any number of reasons such as, for example, if the storage space size exceeds the available storage space of the PSD. Also, in a commercial situation, there may be additional commercial constraints that make a particular backup dataset configuration unacceptable. If it is determined at the test step 326 that the backup dataset(s) are unacceptable, then control transfers from the test step 326 back to the step 324 reconfigure the backup datasets. Note that it is possible in other embodiments to execute the step 322 after the steps 324, 326. Note that it is also possible to only perform the loop formed by the steps 324, 326 a finite number of times, after which error processing is performed.

If it is determined at the test step 326 that the configured backup dataset(s) are acceptable, then control transfers from the step 326 to a step 328 where the PSD is matched with a machine (computer) for which backup is being performed. As discussed elsewhere herein, when an order for a PSD is fulfilled at a backup site, the PSD is correlated with one or more machines for which backup is being performed. That correlation may include, for example, writing to the PSD information that identifies the machine(s). Other correlation techniques may be used. The processing at the step 328 confirms the correlation.

Following the step 328 is a step 332 where it is determined if the confirmation is OK (i.e., if the PSD configured to provide backup services for the machine for which he backup is being performed). If not, then control transfers from the step 332 to a step 334 where error processing is performed, similar to other error processing discussed herein. Following the step 334, processing is complete. If it is determined at the test step 332 that the confirmation is OK, then control transfers from the test step 332 to a step 336 where a full backup is performed to provide full backup data to the PSD. In some embodiments, some or all of the data may be encrypted. In an embodiment herein, data that is backed up from a client is encrypted with a user key and written to the backup site 102 in encrypted form while backup overhead information (e.g., lists of files backed up as well as size information, date of last modification, etc.) is encrypted with an encryption key provided by the backup site. The backup overhead information is encrypted prior to being placed on the PSD, but is decrypted at the backup site 102 prior to data being downloaded from the PSD to the backup site 102. Note also that, in embodiments where the full backup is started over the network 104 and finished using the portable storage device, the backup performed at the step 336 may start where the backup over the network 104 left off.

Following the step 336 is a test step 338 where it is determined if there are more machines to back up. If so, then control transfers from the test step 338 back to the step 328, discussed above, to process the full backup for the next machine. If it is determined at the test step 338 that there are not more machines for which a full backup needs to be performed, then control transfers from the test step 338 to a step 342 where the client machine prompts the user to return the PSD to the backup site (i.e., by shipping the PSD using a commercial carrier). In some embodiments; a shipping label may be printed. Following the step 342 is a step 344 where the client machine(s) enter a freeze state in which no backups may be performed. The step 344 is discussed in more detail elsewhere herein. Following the step 344, processing is complete.

Referring to FIG. 14, a flow chart 350 illustrates steps performed in connection with removing one or more client machines from the freeze state so that backups may be performed. Processing begins at a first step 352 where the client machine(s) wait for a message from the backup site indicating that the full backup data has been successfully uploaded from the PSD. The backup site sends a message to the client once the backup data has been successfully uploaded from the PSD. See, for example, the step 292 of the flowchart 280 of FIG. 11, discussed above. Following the step 352 is a step 354 where incremental backups are enabled (i.e., the client machines are unfrozen). Following the step 354, processing is complete.

In some instances, it may be useful to maintain the state of the system to be able to determine appropriate actions and expectations. The system may use states to distinguish between different operating conditions. In an embodiment herein, the states are PENDING, SHIPPED, SEEDING, SEEDED, LOADING, LOADED, CANCELLING, CANCELLED. The PENDING state corresponds to an order for a PSD being placed, but prior to shipment. The SHIPPED state corresponds to the PSD being shipped to a client site, but prior to the client site initiating a backup on to the PSD. The SEEDING state corresponds to the backup being performed. The SEEDED state corresponds to the backup being complete but prior to providing the data from the PSD to the backup site. The LOADING state corresponds to the data being provided from the PSD to the backup site. The LOADED state corresponds to the data having been provided from the PSD to the backup site. The CANCELLING and CANCELLED states correspond to user initiated cancellation of the system that uses the PSD. Note that while the PSD is in transit, the system may reach the CANCELLING state and not transition into the CANCELLED state until the PSD reaches either the backup site or the client site.

In an embodiment herein, the backup site 102 and/or at least one of the clients 106-108 may maintain a log that is recorded whenever a system state change occurs and/or whenever a user initiates a log entry. The log may be used as a record of backups that have been initiated using PSDs and may be used to facilitate any system debugging that may be necessary or useful. The backup site 102 and clients 106-108 may transmit event data via the network 104 for purposes of facilitating logging by other entities.

Referring to FIG. 15, a log table 360 contains a plurality of entries 362-364, each of which corresponds to a logged event so that the number of entries corresponds to the number of logged events. Each of the entries contains values for a plurality of elements, including a PSD identifier element, a time stamp element, a new state element, a machine ID element, user ID element, and notes. The PSD identifier element identifies the PSD associated with the logged event. The timestamp element indicates when the event was logged. The new state element indicates the new state of the system. The machine ID element indicates the machine associated with the event. The user ID element indicates the identifier of the user operating the system (administrative user) when the event is logged. The notes are optional user notes that may be added to facilitate explanation of the event.

Referring to FIG. 16, a flowchart 380 illustrates steps performed in connection with determining when to log an event. Processing begins at a first test step 382 where it is determined if a status change has occurred. In some cases an entity may have direct knowledge of a status change (e.g., LOADING to LOADED at the backup site 102). In other cases, the information may be provided from one entity to another via the network 104. If it is determined at the test step 382 that no status change has occurred, then control transfers from the test step 382 to a test step 384 where it is determined if a user has requested manually logging an event. In an embodiment herein, a user may request manual logging of an event and provide notes therewith for the note field.

If it is determined at the test step 384 that a user has not requested manual logging of an event, then control transfers from the test step 384 back to the step 382 for another iteration. Otherwise, control transfers from the step 384 to a step 386 where the event is logged. Note that the step 386 is also reached from the test step 382 in response to a state change. Following the step 386, control transfers back to the step 382 for another iteration.

Any appropriate technique may be used to format data for both the full backup and the subsequent incremental backups, and the invention described herein does not depend upon any particular technique being used, so long as the technique is consistent with the system described herein. The system described herein may use any appropriate algorithm/technique to store data. Thus, even if specific storage device configurations are disclosed herein, it should be understood that the system described herein may be implemented on any appropriate platform. Note that the system described herein may be implemented using storage having multiple tiers of physical memory.

In some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method for a backup site to obtain backup data for a client using a portable storage device, the backup site and the client being coupled to a network, the method comprising:

receiving a request from the client for a full backup data operation according to a backup service subscription of the client;

determining whether to perform the full backup data operation using the network or using the portable storage device according to characteristics of the backup service subscription;

when it is determined to perform the full backup data operation using the network, initiating a network operation to copy full backup data from the client to the backup site via the network;

when it is determined to perform the full backup data operation using the portable storage device, performing the following steps:

selecting, at the backup site, the portable storage device, the portable storage device being selected in accordance with the characteristics of the backup service subscription;

correlating, at the backup site, the portable storage device with the client using a correlation device, wherein the correlating further includes providing a first key known to the backup site;

shipping the portable storage device from the backup site to the client;

copying the full backup data from the client to the portable storage device, wherein the copying to the portable storage device includes encrypting data associated with the full backup data using the first key and encrypting at least a portion of the full backup data using a second key that is not known to the backup site;

receiving, at the backup site, the portable storage device having the full backup data;

matching the portable storage device having the full backup data to the client using the correlation device;

providing a direct coupling between the portable storage device having the full backup data and the backup site, wherein the direct coupling is separate from the network; and uploading the full backup data from the portable storage device to the backup site via the direct coupling, wherein the portion of the full backup data encrypted using the second key is stored at the backup site in encrypted form; and after obtaining the full backup data on the backup site, performing at least one incremental backup from the client to the backup site through the network, wherein the at least one incremental backup is based on at least one difference between data on the client site and the prior full backup data on the backup site.

2. The method, according to claim 1, wherein the network is the Internet.

3. The method, according to claim 1, wherein the direct coupling is one of: USB, Firewire, and eSATA.

4. The method, according to claim 1, wherein only a subset of data corresponding to a backup dataset is provided on the portable storage device.

5. The method, according to claim 1, wherein the data associated with the full backup data that is encrypted using the first key includes backup overhead information.

6. The method, according to claim 1, wherein the data associated with the full backup data that is encrypted with the first key is decrypted at the backup site prior to storing the full backup data, that is obtained from the uploading, on the backup site.

7. The method, according to claim 1, wherein the portable storage device is shipped from the client to the backup site.

8. The method, according to claim 1, wherein, prior to the selecting of the portable storage device at the backup site, a user sends an order for the portable storage device to the backup site.

9. A non-transitory computer-readable medium storing computer software that obtains, at a backup site, backup data from a client using a portable storage device, We backup site and the client being coupled to a network, the software comprising:

executable code that receives a request from the client for a full backup data operation according to a backup service subscription of the client;

executable code that determines whether to perform the full backup data operation using the network or using the portable storage device according to characteristics of the backup service subscription;

executable code that, when it is determined to perform the full backup data operation using the network, initiates a network operation to copy full backup data from the client to the backup site via the network;

executable code that, when it is determined to perform the full backup data operation using the portable storage device, performs the following:

selects the portable storage device, the portable storage device being selected in accordance with the characteristics of the backup service subscription;

correlates, at the backup site, the portable storage device with the client using a correlation device, wherein the correlating further includes providing a first key known to the backup site;

prepares the portable storage device for shipping from the backup site to the client;

receives, at the backup site, the portable storage device from the client, wherein the portable storage device is returned from the client and includes the full backup data, the full backup data having been copied from the client to the portable storage device, wherein the portable storage device received at the backup site includes data associated with the full backup data that is encrypted using the first key and at least a portion of the full backup data that is encrypted using a second key that is not known to the backup site;

matches the portable storage device having the full backup data to the client using the correlation device; and uploads the full backup data for the client from the portable storage device to the backup site via a direct coupling between the portable storage device and the backup site, wherein the direct coupling is separate from the network, wherein the portion of the full backup data encrypted using the second key is stored at the backup site in encrypted form; and executable code that, after obtaining the full backup data on We backup site, causes at least one incremental backup to be performed from the client to the backup site through the network, wherein the at least one incremental backup is based on at least one difference between data on the client site and the prior full backup data on the backup site.

10. The non-transitory computer-readable medium according to claim 9, wherein the network is the Internet.

11. The non-transitory computer-readable medium according to claim 9, wherein the direct coupling is one of: USB, Firewire, and eSATA.

12. The non-transitory computer-readable medium according to claim 9, wherein only a subset of data corresponding to a backup dataset is provided on the portable storage device.

13. The non-transitory computer-readable medium according to claim 9, wherein the data associated with the full backup data that is encrypted using the first key includes backup overhead information.

14. The non-transitory computer-readable medium according to claim 9, wherein the data associated with the full backup data that is encrypted with the first key is decrypted at the backup site prior to storing the full backup data, that is obtained from the uploading, on the backup site.

15. A system that backs up data, comprising:
at least one client coupled to a network;
a backup site, coupled to the network to receive data from the at least one client;
a portable storage device that contains full backup data from the at least one client and provides the flail backup data to the backup site; and
at least one computer readable medium storing software that includes:
executable code that receives a request from the client for a full backup data operation according to a backup service subscription of the client;
executable code that determines whether to perform the full backup data operation using the network or using the portable storage device according to characteristics of the backup service subscription;
executable code that, when it is determined to perform the full backup data operation using the network, initiates a network operation to copy full backup data from the client to the backup site via the network;
executable code that, when it is determined to perform the full backup data operation using the portable storage device, performs the following:
selects the portable storage device, the portable storage device being selected in accordance with the characteristics of the backup service subscription;
correlates, at the backup site, the portable storage device with the client using a correlation device, wherein the correlating includes the backup site providing a first key;
prepares the portable storage device for physical shipping from the backup site to the client;
copies the full backup data from the client to the portable storage device wherein the copying to the portable storage device includes encrypting data associated with the full backup data using the first key and encrypting at least a portion of the full backup data using a second key that is not known to the backup site;
receives, at the backup site, the portable storage device from the client, wherein the portable storage device is return from the client and includes the full backup data;
matches the portable storage device having the full backup data to the client using the correlation device; and
uploads the full backup data for the client from the portable storage device to the back site via a direct coupling between the portable storage device and the backup site, wherein the direct coupling is separate from the network, wherein the portion of the full backup data encrypted using the second key is stored at the backup site in encrypted form,
wherein at least one incremental backup is performed from the at least client to the backup site through the network after providing the full backup data to the backup site, and wherein the at least one incremental backup is based on at least one difference between data on the client site and the prior full backup data on the backup site.

16. The system, according to claim 15, wherein the network is the Internet.

17. The system, according to claim 15, wherein the portable storage device is coupled to the backup site via a direct coupling using one of: USB, Firewire, and eSATA and wherein the direct coupling between the portable storage device and the backup site is separate from the network.

18. The system according to claim 15, wherein the data associated with the full backup data that is encrypted using the first key includes backup overhead information.

19. The system according to claim 15, wherein the data associated with the full backup data that is encrypted with the first key is decrypted at the backup site prior to storing the full backup data, that is obtained from the uploading, on the backup site.

* * * * *